Figures 1, 2:
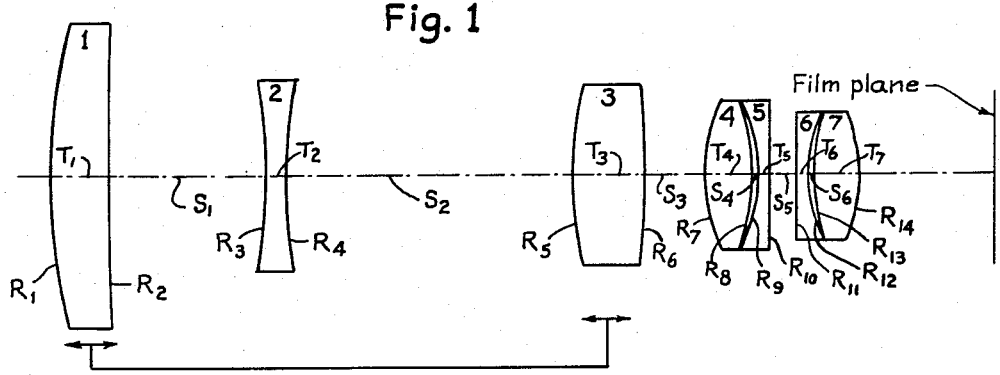

| EF varies, 14.92 to 24.93 mm. | | | | |
|---|---|---|---|---|
| Lens | $N_D$ | V | Radii, mm. | Thicknesses, mm. |
| 1 | 1.5230 | 58.6 | $R_1 = +\ 47.0$ | $T_1 = 4.87$ |
|   |        |      | $R_2 = +\ 260.4$ | $S_1$ varies, 11.75 to 21.90 |
| 2 | 1.6210 | 36.2 | $R_3 = -\ 44.0$ | $T_2 = 1.76$ |
|   |        |      | $R_4 = +\ 41.53$ | $S_2 = 33.65 - S_1$ |
| 3 | 1.5230 | 58.6 | $R_5 = +\ 29.3$ | $T_3 = 5.80$ |
|   |        |      | $R_6 = -\ 73.0$ | $S_3 = 26.60 - S_2$ |
| 4 | 1.6110 | 57.2 | $R_7 = +\ 13.84$ | $T_4 = 3.38$ |
|   |        |      | $R_8 = -\ 16.85$ | $S_4 = 0.37$ |
| 5 | 1.6350 | 35.2 | $R_9 = -\ 12.65$ | $T_5 = 1.00$ |
|   |        |      | $R_{10} = \infty$ | $S_5 = 2.23$ |
| 6 | 1.6490 | 33.8 | $R_{11} = \infty$ | $T_6 = 1.00$ |
|   |        |      | $R_{12} = +\ 10.75$ | $S_6 = 0.48$ |
| 7 | 1.6227 | 57.0 | $R_{13} = +\ 16.85$ | $T_7 = 3.52$ |
|   |        |      | $R_{14} = -\ 12.75$ | |

3,000,260
ZOOM PROJECTION LENS

Eugene Turula and Geraldine B. Lynch, Rochester, N.Y., assignors, by mesne assignments, to Revere Camera Company (formerly Samica Corporation), a corporation of Delaware
Filed Mar. 28, 1960, Ser. No. 17,958
3 Claims. (Cl. 88—57)

This invention relates to a zoom lens, and particularly to a zoom projection lens of a size, quality, and cost suitable for use on an 8 millimeter motion picture projector, i.e., a projector of an amateur or "home movie" type, for projecting onto a screen the images from motion picture film of the so-called 8 millimeter size.

An object of the invention is the provision of a generally improved and more satisfactory zoom lens which is suitable for the particular use above mentioned.

Another object is the provision of a projection lens for an 8 millimeter motion picture projector, which lens is so designed as to have a zoom effect (thus enabling the screen area to be filled by the projected image of the picture, without refocusing) and to be capable of manufacture within the modest cost limits appropriate to a lens for such a projector.

These and other desirable objects may be attained in the manner disclosed as an illustrative embodiment of the invention in the following description and in the accompanying drawings forming a part hereof, in which:

FIG. 1 is a diagrammatic view of a lens in accordance with a preferred embodiment of the present invention; and FIG. 2 is a table of numerical data with respect to one specific embodiment of such a lens.

As understood in the art, a zoom lens differs from other forms of variable magnification lens in that the magnification power may be changed without requiring refocusing. Other or non-zoom forms of variable magnification lenses do require refocusing when the magnification power (or equivalent focal length) is changed.

According to a preferred form of the present invention, the lens has seven separate lens elements, all of which are air spaced from each other. The first, second, and third elements (numbering them consecutively in order from front to rear) collectively may be called the front member of the lens. The fourth through seventh elements, inclusive, collectively may be called the rear member of the lens. To obtain the zoom effect, elements 1 and 3 are moved axially in unison while maintaining a constant distance between them, all other elements remaining stationary. To focus the lens for the required screen distance (i.e., to obtain a sharp image on the screen, whatever its distance may be, within the range of distances normally encountered in ordinary home use of an 8 mm. projector) the entire lens assembly is moved axially, carrying all elements with it.

In the following disclosure, the individual lens elements are numbered from 1 to 7, consecutively from front to rear. The radii of curvature R of the lens surfaces, the axial thicknesses T of the lens elements, and the spacing S between elements, are all expressed in the customary manner, with the usual subscript numerals indicating the particular surface, lens thickness, or air space, numbered in sequence from front to rear. The plus and minus values of the radii R indicate surfaces respectively convex and concave toward the front, in accordance with conventional notation. The respective refractive indices, expressed with reference to the spectral D line of sodium, are indicated by N (or in some cases by $N_D$), and the dispersive indices or Abbe numbers are indicated by V. The diameters of the respective lens elements are designated by D. The focal lengths of certain individual lens elements are indicated by F with a subscript corresponding to the number of the particular lens element in question. The equivalent focal length of the front member of the lens (elements 1 through 3, taken collectively) is indicated by $F_a$ when the parts are set for maximum focal length and by $F_b$ when set for minimum focal length. The equivalent focal length of the rear member (elements 4 through 7, taken collectively) is indicated by $F_c$. A positive value of F indicates a positive or converging lens (or combination of lenses) and a negative value indicates a negative or diverging lens or combination.

According to the present invention, good results are attained when the below-indicated variable factors of the front member are kept substantially within the ranges or limits indicated by the following notations:

Table 1

$+0.757\ F_a < F_1 < +1.135\ F_a$
$+1.237\ F_b < F_1 < +1.855\ F_b$
$-0.251\ F_1 < F_2 < -0.377\ F_1$
$+0.300\ F_1 < F_3 < +0.450\ F_1$
$+0.367\ F_1 < R_1 < +0.497\ F_1$
$+2.036\ F_1 < R_2 < +2.754\ F_1$
$+1.096\ F_2 < R_3 < +1.482\ F_2$
$-1.034\ F_2 < R_4 < -1.399\ F_2$
$+0.611\ F_3 < R_5 < +0.826\ F_3$
$-1.522\ F_3 < R_6 < -2.059\ F_3$

Also, if the rear member is made up of four elements, as in the preferred example, good results are attained by keeping its below-indicated variables within the following ranges:

Table 2

$+0.605\ F_c < R_7 < +0.818\ F_c$
$-0.736\ F_c < R_8 < -0.996\ F_c$
$-0.553\ F_c < R_9 < -0.748\ F_c$
$-0.200\ F_c < R_{10} \leqq \infty$
$+0.200\ F_c < R_{11} \leqq \infty$
$+0.470\ F_c < R_{12} < +0.636\ F_c$
$+0.736\ F_c < R_{13} < +0.996\ F_c$
$-0.557\ F_c < R_{14} < -0.757\ F_c$ A specific example of a lens whose variables fall within the above-mentioned limits or ranges, and which meets all of the outlined requirements, may be constructed in accordance with the numerical data given in the following table, the various symbols in the table having the meanings above explained. All linear dimensions in this example are given in millimeters.

Table 3

| Lens | $N_D$ | V | D, mm. | Radii, mm. | Thicknesses, mm. |
|---|---|---|---|---|---|
| 1 | 1.5230 | 58.6 | 23.5 | $R_1 = +47.0$ | $T_1 = 4.87$ |
|   |        |      |      | $R_2 = +260.4$ | $S_1$ varies, 11.75 to 21.90. |
| 2 | 1.6210 | 36.2 | 14.8 | $R_3 = -44.0$ | $T_2 = 1.76$ |
|   |        |      |      | $R_4 = +41.53$ | $S_2 = 33.65 - S_1$ |
| 3 | 1.5230 | 58.6 | 14.0 | $R_5 = +29.3$ | $T_3 = 5.80$ |
|   |        |      |      | $R_6 = -73.0$ | $S_3 = 26.60 - S_2$ |
| 4 | 1.6110 | 57.2 | 11.5 | $R_7 = +13.84$ | $T_4 = 3.38$ |
|   |        |      |      | $R_8 = -16.85$ | $S_4 = 0.37$ |
| 5 | 1.6350 | 35.2 | 11.5 | $R_9 = -12.65$ | $T_5 = 1.00$ |
|   |        |      |      | $R_{10} = \infty$ | $S_5 = 2.23$ |
| 6 | 1.6490 | 33.8 | 10.0 | $R_{11} = \infty$ | $T_6 = 1.00$ |
|   |        |      |      | $R_{12} = +10.75$ | $S_6 = 0.48$ |
| 7 | 1.6227 | 57.0 | 10.0 | $R_{13} = +16.85$ | $T_7 = 3.52$ |
|   |        |      |      | $R_{14} = -12.75$ |  |

In this specific example, lens elements 1 and 3 are coupled together and move axially as a unit to obtain the zoom effect, all other components remaining stationary during zooming. When elements 1 and 3 are adjusted to their rearmost position, $S_1 = 11.75$ mm., $S_2 = 21.90$ mm., $S_3 = 4.70$ mm., and the lens covers a total angular field of 22 degrees and has an equivalent focal length of 14.92 mm. When elements 1 and 3 are adjusted to their most forward position, $S_1 = 25.25$ mm., $S_2 = 8.40$ mm., $S_3 = 18.20$ mm., and the lens covers a total angular field of 14 degrees and has an equivalent focal length of 24.93 mm. In all intermediate positions of adjustment between these limits, true zooming effect is obtained on a screen at a distance of 12 feet from the plane of the film or picture being projected. Also a good approximation of true zooming effect, close enough for practical purposes, is obtained on a screen at any distance from about 9 feet to 20 feet. In all positions of zooming adjustment, $S_1 + S_2$ is a constant, 33.65 mm., and $S_2 + S_3$ is a constant, 26.60 mm. In Table 3, $S_3$ has been expressed as a function of $S_2$, but in view of the relationships above stated, it is equally correct to express $S_3$ as a function of $S_1$, and to say that $$S_3 = S_1 - 7.05 \text{ mm.}$$

The maximum equivalent focal length, $F_a$, of the front member alone is 114.91, the minimum equivalent focal length thereof, or $F_b$, is 70.30 mm., the equivalent focal length $F_c$ of the rear member alone is 19.45 mm., and the back focus or back focal distance of the rear member alone is 14.32 mm.

According to the present invention, the powers of the elements 1, 2, and 3 and the range of movements of elements 1 and 3 are so chosen as to insure object distances for the surface $R_7$ (i.e., front face of element 4) in such manner that the complete lens system will maintain acceptable focus over the distances normally encountered in the projection of 8 mm. motion pictures for home use. The normal projection distance is taken as 12 feet.

The changes in the equivalent focal length of the lens, due to the zooming movements of the front member, cause a change of the back focal distance. One of the special features of the present invention is that this change in back focal distance is compensated or counterbalanced by the change in "focusing movement" caused by the same change in equivalent focal length, so that the sum of back focal distance plus focusing movement remains a constant, thus enabling the attainment of a true zooming effect, i.e., change in magnification power (for a given screen distance) without change in distance from the lens to the film plane. Hence as long as the screen distance remains unchanged, the magnification power may be varied without destroying the accuracy of focusing.

As here used, the term back focal distance is the distance measured from the vertex of the back surface of the lens to the principal focus located in the back space, this being the definition in the generally accepted Military Standard 150. The term focusing movement means the distance by which the lens must be moved forward from its infinity-focused position in order to focus, on a stationary film plane, an image of an object at a distance less than infinity. Hence the distance from the vertex of the back surface of the lens to the plane of focus for an object at a finite distance (e.g., at 12 feet) is the sum of the back focal distance plus the focusing movement.

The back focal distance of the present lens, when adjusted for an equivalent focal length of 14.92 mm. (i.e., when $S_1$ is 11.75 mm.) is 10.23 mm. Under the same adjustment conditions, and with a projection screen distance of 12 feet, the focusing movement is 0.06 mm. When the lens is adjusted for an equivalent focal length of 24.93 mm. (i.e., when $S_1$ is 25.25 mm.) the back focal distance is 10.12 mm., and the focusing movement (for the same projection screen distance just mentioned) is 0.17 mm. Under both conditions, the sum of back focal distance plus focusing movement is 10.29 mm., and the same is true (for all practical purposes) for intermediate positions of adjustment of the lens. So if the viewing screen is placed at 12 feet, and the projector lens is focused on the screen, the lens can then be zoomed (without refocusing) to vary the size of the projected image on the screen, so as to fill all or any desired part of the screen area.

Variations are possible without departing from the invention. In particular, the back member may be widely varied, so long as it is suitably corrected to compensate for the aberrations of the front member, and the back member may be either simpler or more complex than the four-element back member disclosed as a specific example. The spacing $S_3$ between the front member and the rear member can be made substantially greater or less than the spacing indicated for the preferred design, without adversely affecting the zooming accuracy.

In accordance with customary lens nomenclature, the lens element at the end of the lens system most remote from the projector on which the lens is mounted, has been designated as the front or number 1 element. If the lens were used in taking photographs (which could be done, although the lens is not primarily intended for this purpose) the light would enter through element 1 and pass rearwardly through the other elements in increasing numerical order. However, when the lens is used in the primarily intended way, as a projection lens rather than a picture taking lens, the light passes through the lens system in the opposite direction, first through the rear element of the lens and then successively through the other elements in decreasing numerical order.

What is claimed is:

1. A zoom projection lens comprising a first lens element of positive power, a second lens element of negative power, a third lens element of positive power, and a plurality of lens elements grouped behind said third element and collectively forming a rear member, the below-indicated characteristics of the first three elements being substantially within the ranges respectively indicated below, viz:

$$+0.757\ F_a < F_1 < +1.135\ F_a$$
$$+1.237\ F_b < F_1 < +1.855\ F_b$$
$$-0.251\ F_1 < F_2 < -0.377\ F_1$$
$$+0.300\ F_1 < F_3 < +0.450\ F_1$$
$$+0.367\ F_1 < R_1 < +0.497\ F_1$$
$$+2.036\ F_1 < R_2 < +2.754\ F_1$$
$$+1.096\ F_2 < R_3 < +1.482\ F_2$$
$$-1.034\ F_2 < R_4 < -1.399\ F_2$$
$$+0.611\ F_3 < R_5 < +0.826\ F_3$$
$$-1.522\ F_3 < R_6 < -2.059\ F_3$$

wherein $F_a$ indicates the equivalent focal length of the front member when the parts are set for maximum focal length, $F_b$ indicates the equivalent focal length thereof when set for minimum focal length, F with a numerical subscript indicates the focal length of an individual lens element identified by the subscript, numbering the elements in consecutive order from front to rear, and R with a numercial subscript indicates the radius of curvature of a surface identified by the subscript, numbering the surfaces in consecutive order from front to rear, the first and third elements being movable axially in unison while the other elements remain axially stationary, to vary the equivalent focal length and magnification power of the lens system without substantial change in the back focus.

2. A zoom lens especially for projection purposes, having seven lens elements, the characteristics of the respective lens elements and their spatial relationship to each other being substantially in the proportions shown by the data in the following table:

| Lens | $N_D$ | V | Radii, mm. | Thicknesses, mm. |
|---|---|---|---|---|
| 1 | 1.5230 | 58.6 | $R_1 = +47.0$ <br> $R_2 = +260.4$ | $T_1 = 4.87$ <br> $S_1$ varies, 11.75 to 21.90 |
| 2 | 1.6210 | 36.2 | $R_3 = -44.0$ <br> $R_4 = +41.53$ | $T_2 = 1.76$ <br> $S_2 = 33.65 - S_1$ |
| 3 | 1.5230 | 58.6 | $R_5 = +29.3$ <br> $R_6 = -73.0$ | $T_3 = 5.80$ <br> $S_3 = 26.60 - S_2$ |
| 4 | 1.6110 | 57.2 | $R_7 = +13.84$ <br> $R_8 = -16.85$ | $T_4 = 3.38$ <br> $S_4 = 0.37$ |
| 5 | 1.6350 | 35.2 | $R_9 = -12.65$ <br> $R_{10} = \infty$ | $T_5 = 1.00$ <br> $S_5 = 2.23$ |
| 6 | 1.6490 | 33.8 | $R_{11} = \infty$ <br> $R_{12} = +10.75$ | $T_6 = 1.00$ <br> $S_6 = 0.48$ |
| 7 | 1.6227 | 57.0 | $R_{13} = +16.85$ <br> $R_{14} = -12.75$ | $T_7 = 3.52$ | wherein the lens elements are numbered in order from front to rear in the first column, their respective refractive indices (for the D line of the spectrum) and dispersive indices are given in the columns headed $N_D$ and V, the radius of curvature of each lens surface is indicated by R with a numerical subscript identifying the particular surface, numbering the surfaces in consecutive order from front to rear, and the respective thicknesses of lens elements and spaces between lens elements are indicated by T and S with numerical subscripts identifying the particular lens element and the particular space numbered from front to rear.

3. A zoom projection lens comprising a front member and a rear member, the front member having three lens elements of which the first and third, counting from the front, are coupled to each other for conjoint equal axial movement to vary the magnification power of the lens while the second element remains axially stationary, the characteristics of the lens elements of the front member being substantially in the proportions shown by the data in the following table:

| Lens | $N_D$ | V | Radii, mm. | Thicknesses, mm. |
|---|---|---|---|---|
| 1 | 1.5230 | 58.6 | $R_1 = +47.0$ <br> $R_2 = +260.4$ | $R_1 = 4.87$ <br> $S_1$ varies, 11.75 to 21.90 |
| 2 | 1.6210 | 36.2 | $R_3 = -44.0$ <br> $R_4 = +41.53$ | $T_2 = 1.76$ <br> $S_2 = 33.65 - S_1$ |
| 3 | 1.5230 | 58.6 | $R_5 = +29.3$ <br> $R_6 = -73.0$ | $T_3 = 5.80$ | wherein the lens elements are numbered in order from front to rear in the first column, their respective refractive indices (for the D line of the spectrum) and dispersive indices are given in the columns headed $N_D$ and V, the radius of curvature of each lens surface is indicated by R with a numerical subscript identifying the particular surface, numbering the surfaces in consecutive order from front to rear, and the respective thicknesses of lens elements and spaces between lens elements are indicated by T and S with numerical subscripts identifying the particular lens element and the particular space numbered from front to rear, the rear member of the lens comprising a plurality of lens elements designed to compensate for aberrations produced by the front member.

UNITED STATES PATENTS
References Cited in the file of this patent
2,925,010   Turula et al. _____ Feb. 16, 1960